ial No. 530,030.

UNITED STATES PATENT OFFICE.

JOHN W. HICKMAN, OF RUSSELLVILLE, PENNSYLVANIA.

FERTILIZER.

SPECIFICATION forming part of Letters Patent No. 536,283, dated March 26, 1895.

Application filed November 26, 1894. Serial No. 530,030. (No specimens.)

*To all whom it may concern:*

Be it known that I, JOHN W. HICKMAN, a citizen of the United States, residing at Russellville, in the county of Chester and State of Pennsylvania, have invented certain new and useful Improvements in Fertilizers; and I do hereby declare the following to be a full, clear, and exact description of the invention, such as will enable others skilled in the art to which it appertains to make and use the same.

This invention relates to improvements in fertilizers; and it consists in the novel combination of ingredients hereinafter set forth, the same being thoroughly mixed, before the fertilizer is used, whereby the plants are given a healthy growth and the same as well as young vines and trees are protected from fungus and parasites.

My fertilizer consists of the following ingredients, combined in or about the proportions stated, viz:—muriate of potash, three hundred and eighty-nine pounds; black hellebore, five pounds; nitrate of soda, three hundred pounds; paris green, five pounds; superphosphate of lime, eight hundred pounds; hydrocyanic acid, one pound; ground bone, five hundred pounds.

The above ingredients are thoroughly mixed together by means of a shovel, rollers and sieve, in fact in any convenient manner and by machinery if desired that they may be intermingled in one common mass. The compound is then applied to the soil by means of a hoe or drilled into the ground by means of a fertilizer-distributer or harrowed into the ground after having been thrown upon the same, by a shovel or otherwise.

The above composition it will be seen comprises ingredients designed to destroy any insects that increasing fertility brings forth that feed upon the plants or vegetable matter, that make their sudden appearance upon the surface of the soil at the early growth of the plant. This is more particularly so in reference to corn crops, and by the combination of the ingredients aforesaid and the thorough mixing of the same in one solid mass, not only the desired effect can be obtained for the rapid and healthful growth of the plants, but a most desirable insecticide is produced, and only when said insecticide forms a component part of a fertilizer is it capable of a proper application or distribution, and a composition as herein set forth is inexpensive and easily and quickly applied. The fifth ingredient I obtain by digesting ground South Carolina rock with sulphuric acid, and the seventh ingredient is designed to be raw animal bone.

What I claim is—

The fertilizer herein described consisting of muriate of potash, black hellebore, nitrate of soda, paris green, superphosphate of lime, hydrocyanic acid and ground bone, in about the proportions set forth.

In testimony whereof I affix my signature in presence of two witnesses.

JOHN W. HICKMAN.

Witnesses:
J. A. JOHNSON,
G. W. HUNTER.